United States Patent
Sodagar

(10) Patent No.: US 11,750,678 B2
(45) Date of Patent: Sep. 5, 2023

(54) MANIFEST BASED CMAF CONTENT PREPARATION TEMPLATE FOR 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/725,919

(22) Filed: Apr. 21, 2022

(65) Prior Publication Data
US 2022/0368753 A1 Nov. 17, 2022

Related U.S. Application Data

(60) Provisional application No. 63/187,803, filed on May 12, 2021.

(51) Int. Cl.
*H04L 67/02* (2022.01)
*H04L 65/752* (2022.01)

(52) U.S. Cl.
CPC ............ *H04L 65/752* (2022.05); *H04L 67/02* (2013.01)

(58) Field of Classification Search
CPC .............................. H04L 65/752; H04L 67/02
See application file for complete search history.

(56) References Cited

U.S. PATENT DOCUMENTS

| 2018/0109577 | A1* | 4/2018 | Deshpande | H04N 21/47202 |
| 2019/0238950 | A1* | 8/2019 | Stockhammer | H04N 21/6587 |
| 2020/0304554 | A1* | 9/2020 | Stockhammer | H04N 21/85406 |
| 2021/0099506 | A1 | 4/2021 | Sodagar | |

OTHER PUBLICATIONS

"Publicly Available Specification (PAS); DASH-IF Content Protection Information Exchange Format", ETSI TS 103 799 V1.1.1, Apr. 2021, pp. 1-48.
3rd Generation Partnership Project; Technical Specification Group Services and System Aspects; 5G Media Streaming (5GMS); Protocols (Release 16), 3GPP TS 26.512 V16.1.0, Dec. 2020, 96 pages.
"3rd Generation Partnership Project; Technical Specification Group Services and System Aspects; 5G Media Streaming (5GMS); General description and architecture (Release 16)", 3GPP TS 26.501 V16.3.1, Mar. 2020, 63 pages.
International Search Report dated Jul. 25, 2022 in International Application No. PCT/US2022/027432.
(Continued)

Primary Examiner — Cheikh T Ndiaye
(74) Attorney, Agent, or Firm — Sughrue Mion, PLLC

(57) ABSTRACT

Systems, devices, and methods for media processing and streaming, including receiving content to be prepared for a 5G media streaming (5GMS) network; receiving a content preparation template (CPT), wherein the CPT specifies input characteristics of an input Common Media Application Format (CMAF) track corresponding to the content, output characteristics of a set of output CMAF tracks corresponding to the content, and encoding parameters corresponding to the set of output CMAF tracks; preparing the content according to the CPT; and streaming the prepared content over the 5GMS network to a media streaming client.

20 Claims, 6 Drawing Sheets

(56) References Cited

OTHER PUBLICATIONS

Written Opinion of the International Searching Authority dated Jul. 25, 2022 in International Application No. PCT/US2022/027432.
Extended European Search Report dated Jul. 14, 2023 in European Application No. 22786877.5.
Tencent, "FS_5GMS_EXT: Content preparation deployment scenarios and functional description", 3GPP TSG SA4 Meeting #112e, TD S4-210101, Feb. 1-10, 2021 (7 pages total).
Qualcomm Incorporated et al., "[FS_5GMS-EXT] Key Topic Content Preparation", 3GPP TSG SA WG4 MBS SWG post 112-e, S4aI201134 (6 pages total).
Tencent, [FS_5GMS-EXT] Candidate solution for Content Preparation format, 3GPP SA4#114-e, S4-210940, May 19-28, 2021 (6 pages total).
3rd Generation Partnership Project; Technical Specification Group Services and System Aspects; Study on 5G media streaming extensions (Release 17), 3GPP TR 26.804 V0.2.1, Apr. 2021 pp. 2-60 (60 pages total).

\* cited by examiner

US 11,750,678 B2

MANIFEST BASED CMAF CONTENT PREPARATION TEMPLATE FOR 5G NETWORKS

CROSS-REFERENCE TO RELATED APPLICATION

This application claims priority from U.S. Provisional Application No. 63/187,803, filed on May 12, 2021, in the United States Patent and Trademark Office, the disclosure of which is incorporated herein by reference in its entirety.

FIELD

Embodiments of this disclosure are directed to media processing and streaming methods and systems, more particularly to preparing content based on content preparation templates.

BACKGROUND

3rd Generation Partnership Project (3GPP) TS26.512 (3rd Generation Partnership Project; Technical Specification Group Services and System Aspects; 5G Media Streaming (5GMS); Protocols (Release 16), V1.1.0) defines the concept of content preparation template to set up the processing of the media streams before hosting the content for streaming. It also defines the content hosting configuration for the distribution of the content. However, it doesn't define a format for the content preparation template.

SUMMARY

According to one or more embodiments, a method of content preparation for a 5G media streaming (5GMS) network performed by at least one processor includes receiving content to be prepared for the 5GMS network; receiving a content preparation template (CPT), wherein the CPT specifies input characteristics of an input Common Media Application Format (CMAF) track corresponding to the content, output characteristics of a set of output CMAF tracks corresponding to the content, and encoding parameters corresponding to the set of output CMAF tracks; preparing the content according to the CPT; and streaming the prepared content over the 5GMS network to a media streaming client.

According to one or more embodiments, a device for content preparation for a 5GMS network includes at least one memory configured to store program code; and at least one processor configured to read the program code and operate as instructed by the program code, the program code including: first receiving code configured to cause the at least one processor to receive content to be prepared for the 5GMS network; second receiving code configured to cause the at least one processor to receive a content preparation template (CPT), wherein the CPT specifies input characteristics of an input Common Media Application Format (CMAF) track corresponding to the content, output characteristics of a set of output CMAF tracks corresponding to the content, and encoding parameters corresponding to the set of output CMAF tracks; preparing code configured to cause the at least one processor to prepare the content according to the CPT; and streaming code configured to cause the at least one processor to stream the prepared content over the 5GMS network to a media streaming client.

According to one or more embodiments, a non-transitory computer-readable medium stores instructions, the instructions including one or more instructions that, when executed by one or more processors of a device for content preparation for a 5GMS network, cause the one or more processors to: receive content to be prepared for the 5GMS network; receive a content preparation template (CPT), wherein the CPT specifies input characteristics of an input Common Media Application Format (CMAF) track corresponding to the content, output characteristics of a set of output CMAF tracks corresponding to the content, and encoding parameters corresponding to the set of output CMAF tracks; prepare the content according to the CPT; and stream the prepared content over the 5GMS network to a media streaming client.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
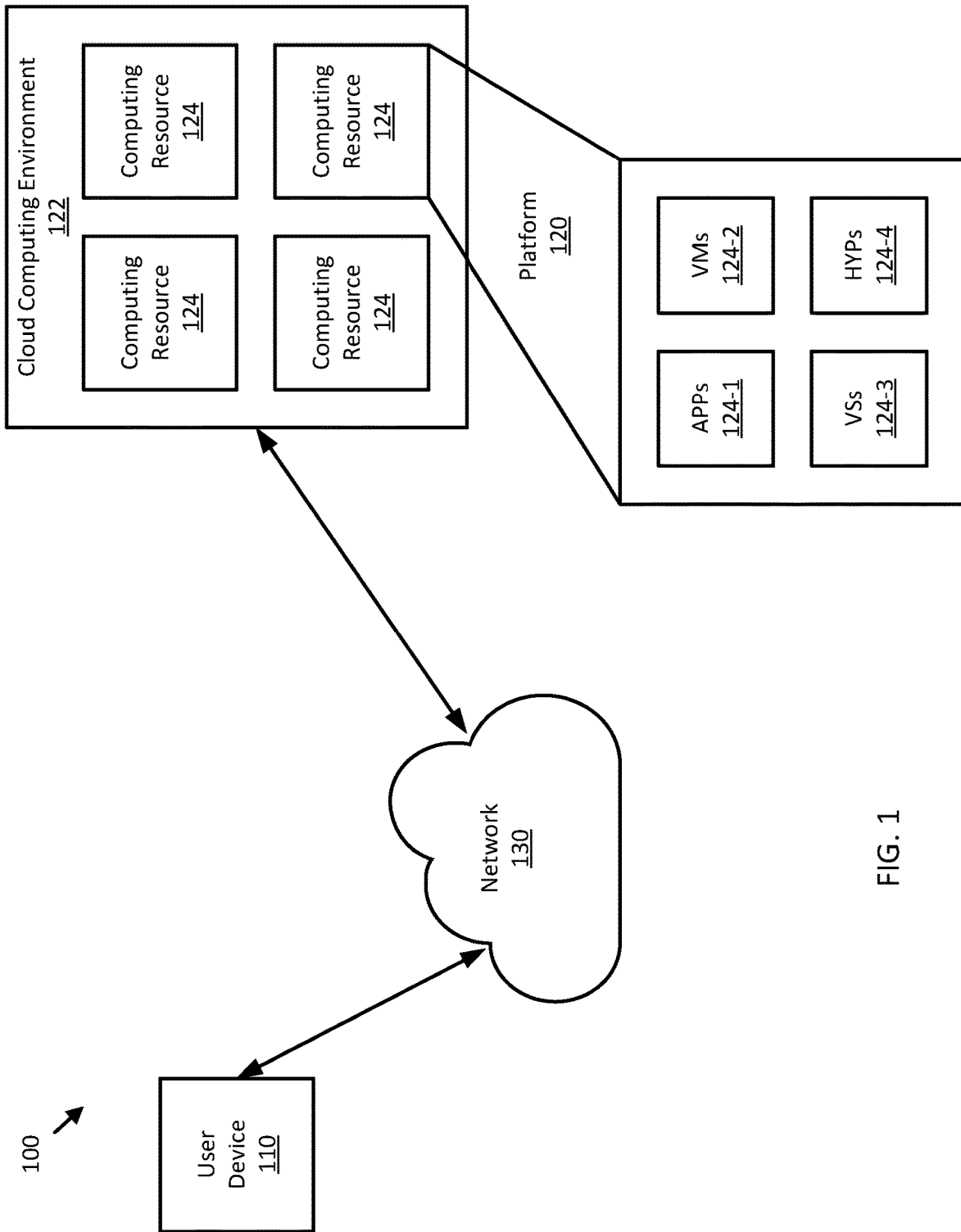
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
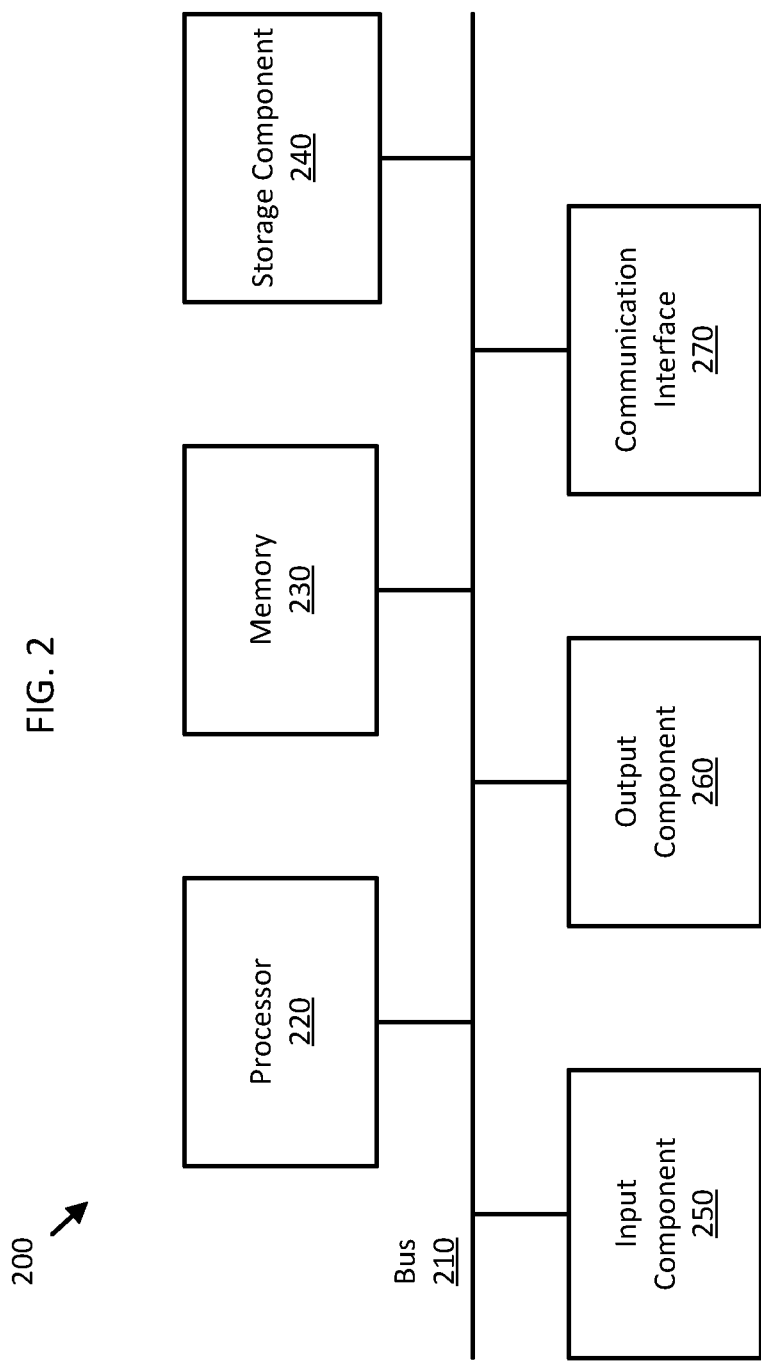
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

The 5G media streaming architecture defined in 3GPP TS26.501 (3rd Generation Partnership Project; Technical Specification Group Services and System Aspects; 5G Media Streaming (5GMS); General description and architecture (Release 16), V16.3.1) only defines a general architecture for uplink and downlink media streaming. Further, 3GPP TS26.512 defines the concept of a content preparation template (CPT) to prepare received content for downlink streaming. However, it doesn't define any specific template for content preparation.

Figure 3:
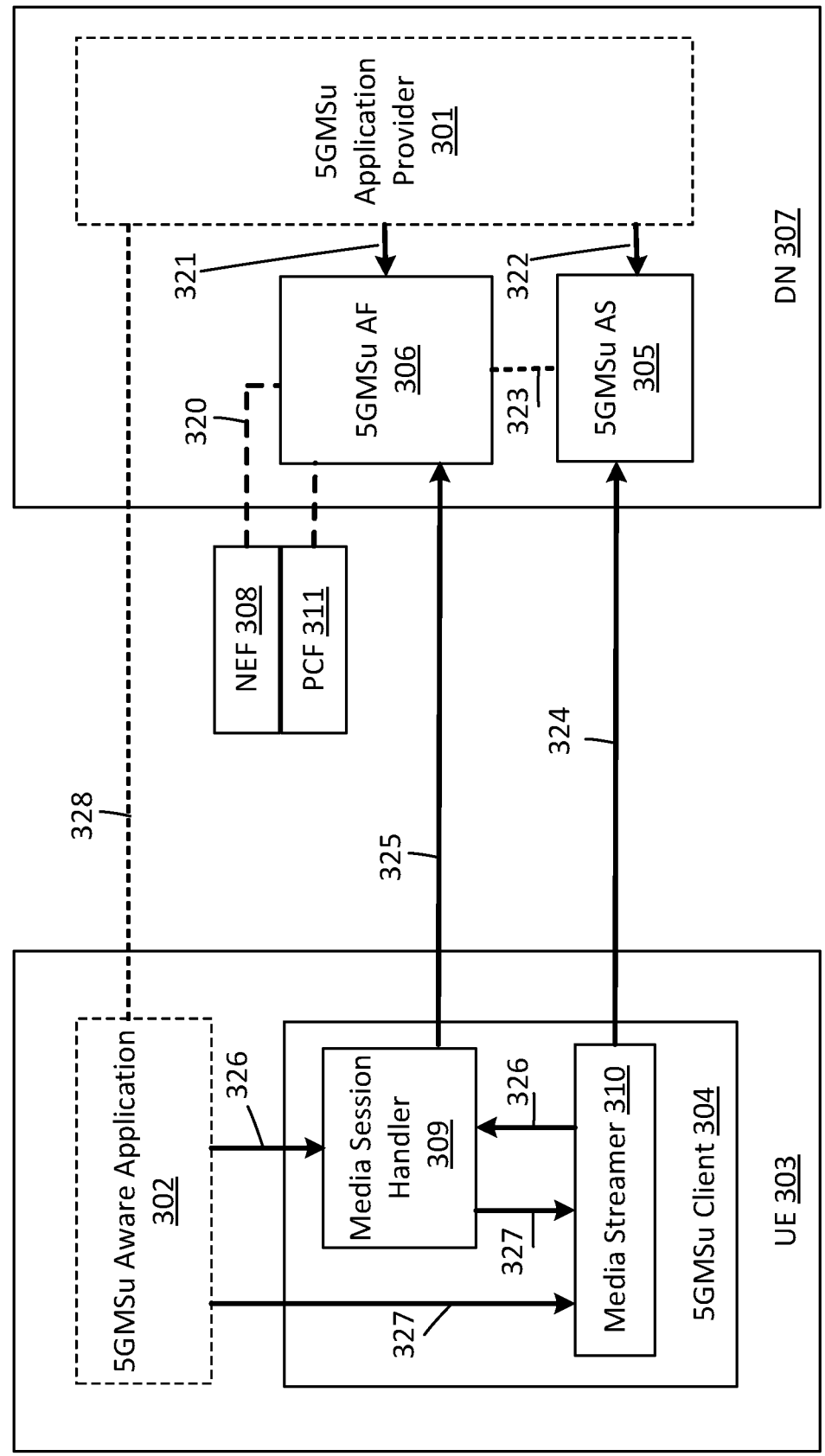
FIG. 3 is a block diagram of a media architecture for media uplink streaming, according to embodiments.
Figure 4:
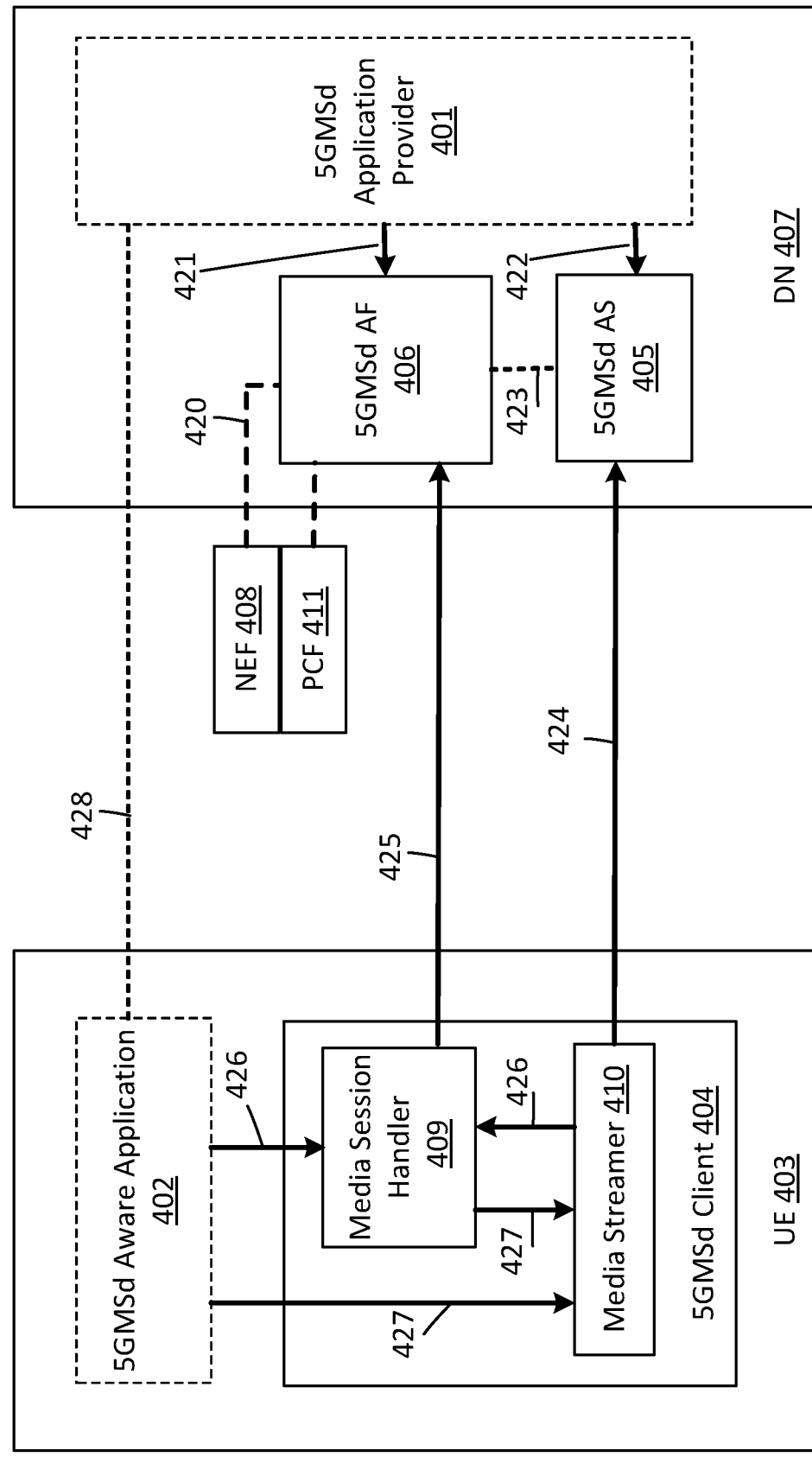
FIG. 4 is a block diagram of a media architecture for media downlink streaming, according to embodiments.

A 5G media-streaming architecture for downlink and uplink streaming is shown in FIGS. 3 and 4.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 303 by implementing external application or content service provider specific logic and enabling the establishment of a media session. 5GMSu AS 305 may host 5G media functions. 5GMSu Application Provide 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interface. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

FIG. 4 is a diagram of a media architecture 400 for media downlink streaming. A 5G media streaming downlink (5GMSd) Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd Application Server (AS) may be an AS dedicated to 5G Media Downlink Streaming. 5GMSd Client 404 may be a UE 403 internal function dedicated to 5G Media Downlink Streaming.

5GMSd Application Function (AF) 406 and 5GMSd AS 405 may be Data Network (DN) 407 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 403 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different Policy or Charging Function (PCF) 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Figure 5:
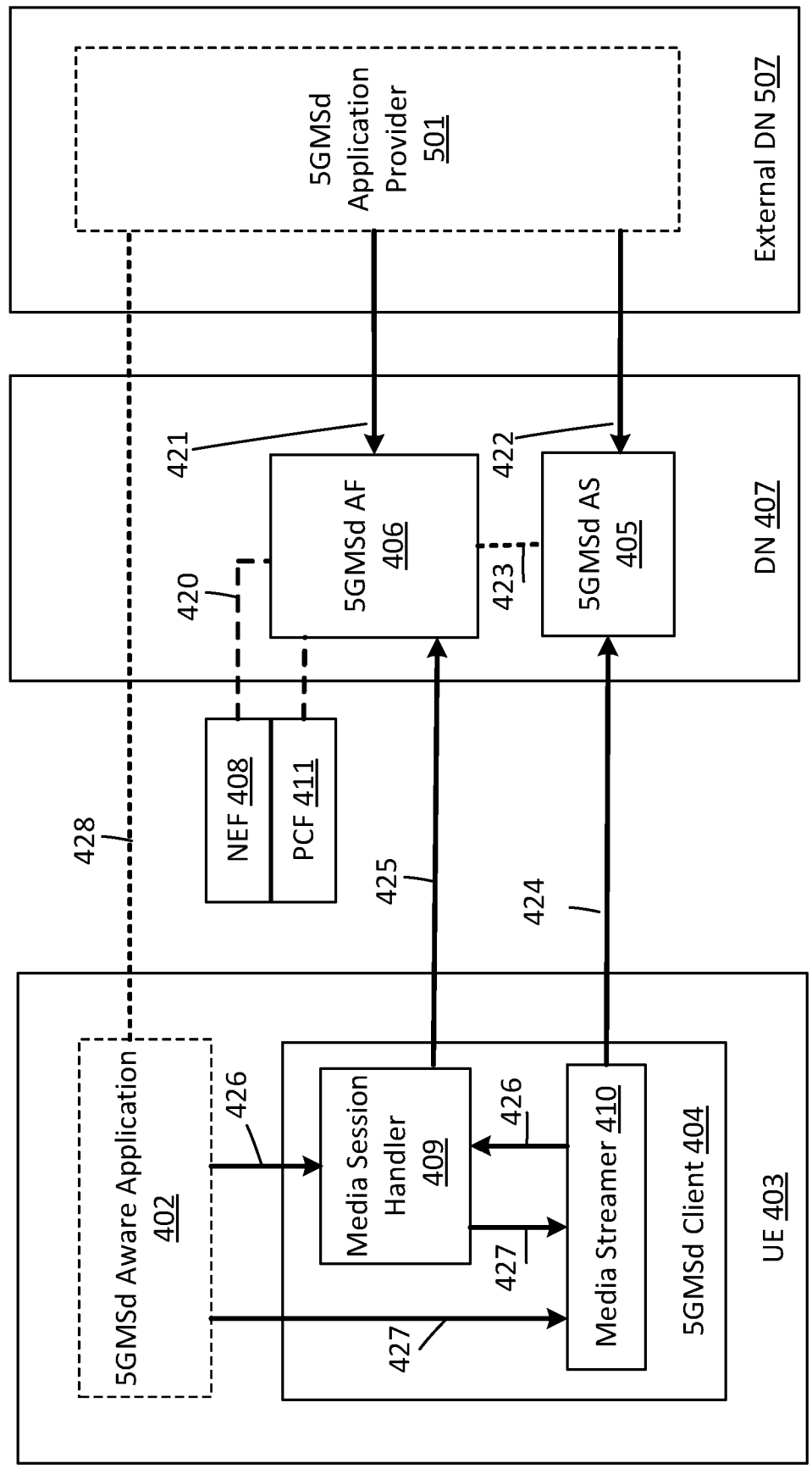
FIG. 5 is a block diagram of a media architecture for media downlink streaming, according to embodiments.

FIG. 5 is a diagram of a media architecture 500 for media downlink streaming, according to embodiments. As can be seen in FIG. 5, media architecture 500 may be similar to media architecture 400, except that 5GMSd Aware Application 402, 5GMSd AF 406, and 5GMSd AS 405 may be in communication with 5GMSd Application Provider 501. In embodiments, 5GMSd Application Provider 501 may be included in external DN 507, rather than trusted DN 407.

As discussed above, 3GPP TS26.512 defines the concept of content preparation template to prepare received content for downlink streaming, but does not define a format for the content preparation template.

According to embodiments, a use-case for embodiments discussed herein may include a streaming scenario in which a single common media application format (CMAF) track is provided as an input, and a single unencrypted CMAF switching set is provided as an output. For example, in embodiments, the following constraints may be used for producing CMAF streaming content:

1. The input to the content preparation may be one CMAF track.
2. The output may be a set of CMAF tracks as part of one CMAF Switching Set.
3. The input and output tracks may be unencrypted.

Content Preparation Parameters for CMAF Encoding

In embodiments, one or more the following parameters may be defined for the content preparation template:

1. The address/location of the input CMAF segments
2. The output CMAF switching set information
    a. Output parameters: characteristics that may be described in a manifest such as MPD or DASH. While these parameters are per track, they can be described one if one or more of them are common cross tracks. For example:
        i. Container profile, Codec/profile/level, bandwidth, container profiles, maximum SAP period, start with SAP,
        ii. Width, height, sample aspect ratio, frame rate,
        iii. Audio sampling rate, audio channel configuration
    b. Encoding parameters: parameters used for encoding each track that are not presented in the output manifest, such as bit-rate control, motion search area, and algorithm, CBR/VBR/Capped VBR encoding, use of specific quality metrics. The encoding parameters may include:
        i. Common encoding parameters (which may be common in a codec/profile/level)
        ii. Vendor-defined (implementation-specific) parameters The following five examples, listed as Example 1 through Example 5, provide examples for describing the input characteristics and output characteristics in the content preparation template, according to embodiments. Examples 1 and 2 relate to input characteristics, and Examples 3 through 5 relate to output characteristics.

Example 1—CMAF Input Format Using DASH MPD Manifest

According to Example 1, the characteristics of the input can be defined by a DASH MPD manifest. The manifest can define the characteristics of the CMAF track. In embodiments, the DASH MPD manifest may define the locations of CMAF segments when HTTP pull protocol is used to egest those segments.

Example 2—CMAF Input Format Using a New Document Format

According to Example 2, a new document format, using a format such as JavaScript Object Notation (JSON), can be used for describing the input CMAF segments. Such a solution may provide benefits when the same format is used for describing the output CMAF formats. This document format may be an equivalent of a manifest format described in Example 1.

Example 3—CMAF Output Format Using Extended Manifest Format

According to Example 3, a standard manifest format may be used for output parameters. In embodiments, the manifest format may be extended for carrying encoding parameters, for example common parameters and also vendor-defined parameters.

In embodiments, the MPD format may be used, and descriptors may be added to the adaptation set and/or representations for the encoding parameters. For example, two classes of descriptors can be added:
1. The common encoding descriptor per codec, carrying common parameters
2. Vendor-specific descriptors, carrying vendor-defined parameters.

Because the MPD essential and supplemental descriptor syntax allows defining different scheme uniform resource identifiers, (URIs), the above features can be expressed using the same descriptor data type and by defining specific schemes identifies.

Example 4—CMAF Output Format Using Manifest with External Encoding Document

According to Example 4, a standard manifest may be used to describe the output parameters and a separate document is used to describe the encoding parameters.

For example, the following elements may be used:
1. MPD format for output parameters
2. A JSON array with object array element which includes a representation id, referencing an representation in the MPD of Example 1 indicating the encoding parameters for that representation. The encoding parameters may include a set of common parameters and may also be extended with vendor-specific parameters inside an object that can be identified with a URI identifier for any specific vendor.

Example 5—CMAF Output Format Using a Document Defining Both Manifest and Encoding Parameters According to Example 5, a new document may be used for describing both manifest and encoding parameters. An example of such a solution may be a JSON array, which may include an object array element including the following information:
1. The output parameters commonly used in a manifest
2. The common encoding parameters
3. The encoder specific parameters with specific vendor's identifier (such as URI)

In embodiments, a Content Protection Information Exchange Format (CPIX) according to DASH-IF (ETSI TS 103 799 V1.1.1, Publicly Available Specification (PAS); DASH-IF Content Protection Information Exchange Format) may be used. For example, the CPIX format may be extended to carry additional parameters that are needed. Creating the Content Preparation Template by Combining the Input and Output Descriptions In embodiments, all of the inputs, outputs, and encoding information may be be provided as the content preparation template. Accordingly, the following solutions may be possible for the overall template.

For example, in embodiments the content preparation template may include a single MPD. The MPD may include one adaptation set with one input representation describing the input according to Example 1, and one adaptation set with multiple input representation describing the output tracks according to Example 3.

As another example, in embodiments the content preparation template may include a document including two MPDs, and may also include an extra document. For example, the content preparation template may include one MPD describing the input according to Example 1, and one of: an MPD describing the outputs and encoding parameters according to Example 3, or an MPD describing the outputs and one document describing the encoding parameters according to Example 4.

As another example, in embodiments the content preparation template may include a single JSON document. The JSON document may include one item describing the input representation according to Example 2, and an array of objects according to Example 5, each of which describes one output and the encoding parameter for that output.

Accordingly, embodiments may relate to a method for defining CMAF content preparation template using a single MPD in which one adaptation set defines the input characteristics, and one adaptation set defines the characteristics of the outputs, wherein each representation represents an output and the encoding parameters are added using an essential/supplemental descriptor.

Further, embodiments may relate to a method for defining CMAF content preparation template using a JSON document with three objects: one MPD for defining the input, one MPD for defining the outputs, and a JSON array object, wherein each object element has a reference to the id of a representation in the output MPD, and the encoding parameters for that output.

In addition, embodiments may relate to a method for defining CMAF content preparation template using a JSON document with three objects: one object for defining the input characteristics in JSON, and an array object wherein each element is an object where describes an output as well as the encoding parameters for that output.

Figure 6:
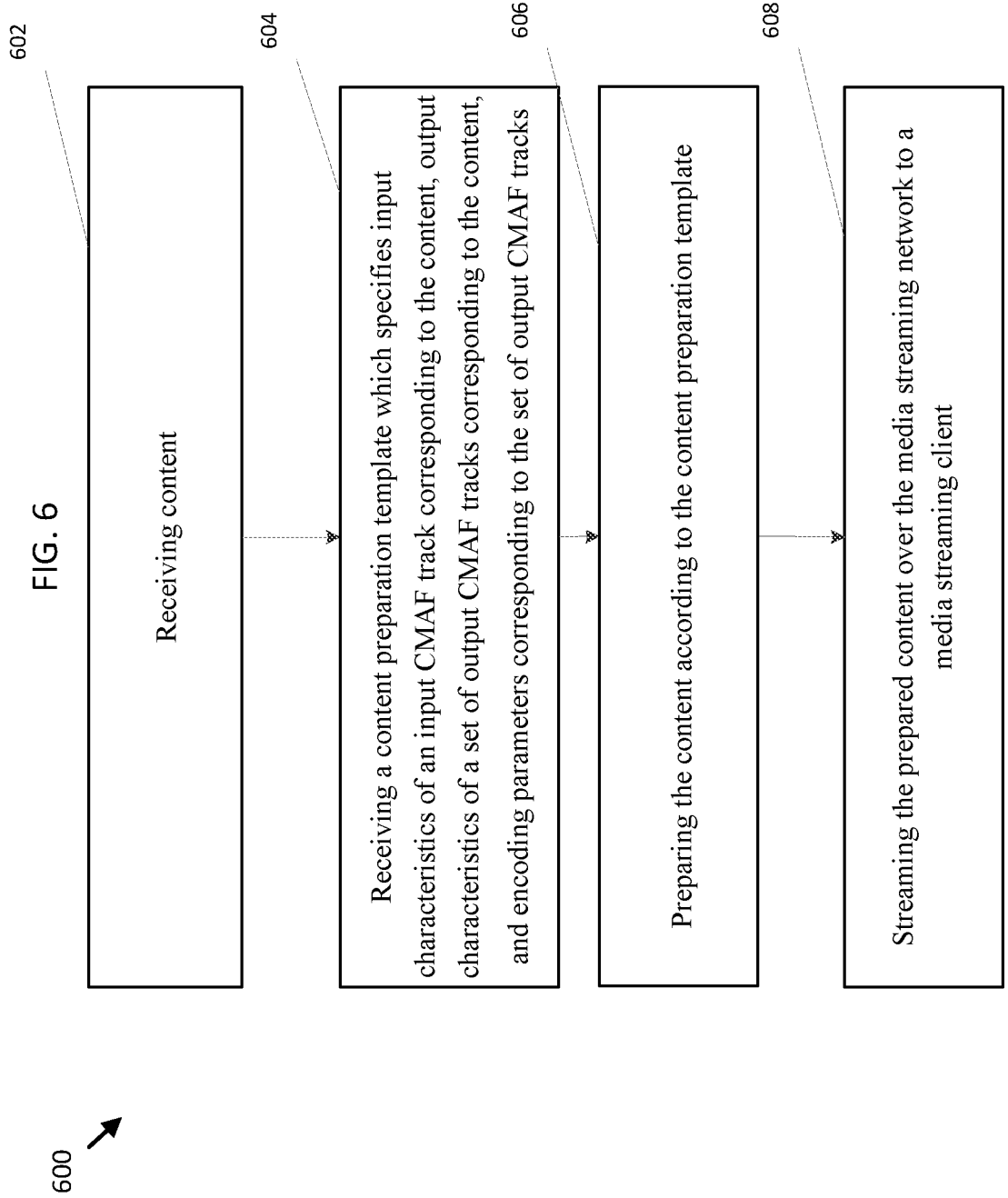
FIG. 6 is a flowchart of an example process for content preparation for a 5GMS network, according to embodiments.

FIG. 6 is a flowchart of example process 600 of content preparation for a media streaming network, for example a 5GMS network. In some implementations, one or more process blocks of FIG. 6 may be performed by 5GMSd AF 406. In some implementations, one or more process blocks of FIG. 6 may be performed by another device or a group of devices separate from or including 5GMSd AF 406, such as 5GMSu AF 306, 5GMSu Application Provider 301, 5GMSu Application Provider 401, or other elements of DN 307, DN 407, and external DN 507.

As shown in FIG. 6, process 600 may include receiving content to be prepared for the media streaming network, for example the 5GMS network (block 602).

As further shown in FIG. 6, process 600 may include receiving a content preparation template (CPT), wherein the CPT specifies input characteristics of an input Common Media Application Format (CMAF) track corresponding to the content, output characteristics of a set of output CMAF tracks corresponding to the content, and encoding parameters corresponding to the set of output CMAF tracks (block 604).

As further shown in FIG. 6, process 600 may include preparing the content according to the content preparation template (block 606).

As further shown in FIG. 6, process 600 may include streaming the prepared content over the media streaming network, for example the 5GMS network, to a media streaming client (block 608).

In embodiments, the CPT may include a Dynamic Adaptive Streaming over Hypertext Transfer Protocol (DASH) Media Presentation Description (MPD) including a first adaptation set and a second adaptation set, wherein the first adaptation set corresponds to the input characteristics, and wherein the second adaptation set corresponds to the output characteristics and the encoding parameters.

In embodiments, the first adaptation set may include a representation corresponding to the input characteristics, and the second adaptation set may include a plurality of representations corresponding to the set of Output CMAF tracks, and at least one additional descriptor corresponding to the encoding parameters.

In embodiments, the CPT may include a first Dynamic Adaptive Streaming over Hypertext Transfer Protocol (DASH) Media Presentation Description (MPD) corresponding to the input characteristics and a second DASH MPD corresponding to the output characteristics and the encoding parameters.

In embodiments, the second DASH MPD may include an adaptation set including a plurality of representations corresponding to the set of Output CMAF tracks, and at least one additional descriptor corresponding to the encoding parameters.

In embodiments, the second DASH MPD may include an adaptation set including a plurality of representations corresponding to the set of Output CMAF tracks, and a JavaScript Object Notation (JSON) object specifying a representation identifier which identifies a representation in the first MPD, wherein the representation corresponds to the encoding parameters.

In embodiments, the CPT may include a JavaScript Object Notation (JSON) document including a first JSON object corresponding to the input characteristics, and an array of JSON objects corresponding to the output characteristics and the encoding parameters.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of processes 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of content preparation for a 5G media streaming (5GMS) network performed by at least one processor, the method comprising:
    receiving content to be prepared for the 5GMS network;
    receiving a content preparation template (CPT), wherein the CPT includes a Dynamic Adaptive Streaming over Hypertext Transfer Protocol (DASH) Media Presentation Description (MPD) that specifies input characteristics of an input Common Media Application Format (CMAF) track corresponding to the content, output characteristics of a set of output CMAF tracks corresponding to the content, and a plurality encoding parameters corresponding to the set of output CMAF tracks, wherein the MPD includes at least one additional descriptor that includes a uniform resource identifier (URI) corresponding to at least one encoding parameter from the plurality of encoding parameters;
    preparing the content according to the CPT; and
    streaming the prepared content over the 5GMS network to a media streaming client.

2. The method of claim 1, wherein the DASH MPD includes a first adaptation set and a second adaptation set,
    wherein the first adaptation set corresponds to the input characteristics, and
    wherein the second adaptation set corresponds to the output characteristics and the plurality of encoding parameters.

3. The method of claim 2, wherein the first adaptation set comprises a representation corresponding to the input characteristics, and
    wherein the second adaptation set comprises a plurality of representations corresponding to the set of Output CMAF tracks.

4. The method of claim 1, wherein the DASH MPD comprises a first DASH MPD corresponding to the input characteristics and a second DASH MPD corresponding to the output characteristics and the plurality of encoding parameters.

5. The method of claim 4, wherein the second DASH MPD comprises an adaptation set including a plurality of representations corresponding to the set of Output CMAF tracks.

6. The method of claim 4, wherein the second DASH MPD comprises an adaptation set including a plurality of representations corresponding to the set of Output CMAF tracks, and a JavaScript Object Notation (JSON) object specifying a representation identifier which identifies a representation in the first MPD, wherein the representation corresponds to the plurality of encoding parameters.

7. The method of claim 1, wherein the CPT comprises a JavaScript Object Notation (JSON) document including a first JSON object corresponding to the input characteristics, and an array of JSON objects corresponding to the output characteristics and the plurality of encoding parameters.

8. A device for content preparation for a 5G media streaming (5GMS) network, the device comprising:
at least one memory configured to store program code; and
at least one processor configured to read the program code and operate as instructed by the program code, the program code including:
first receiving code configured to cause the at least one processor to receive content to be prepared for the 5GMS network;
second receiving code configured to cause the at least one processor to receive a content preparation template (CPT), wherein the CPT includes a Dynamic Adaptive Streaming over Hypertext Transfer Protocol (DASH) Media Presentation Description (MPD) that specifies input characteristics of an input Common Media Application Format (CMAF) track corresponding to the content, output characteristics of a set of output CMAF tracks corresponding to the content, and a plurality of encoding parameters corresponding to the set of output CMAF tracks, wherein the MPD includes at least one additional descriptor that includes a uniform resource identifier (URI) corresponding to at least one encoding parameter from the plurality of encoding parameters;
preparing code configured to cause the at least one processor to prepare the content according to the CPT; and
streaming code configured to cause the at least one processor to stream the prepared content over the 5GMS network to a media streaming client.

9. The device of claim 8, wherein the DASH MPD includes a first adaptation set and a second adaptation set,
wherein the first adaptation set corresponds to the input characteristics, and
wherein the second adaptation set corresponds to the output characteristics and the plurality of encoding parameters.

10. The device of claim 9, wherein the first adaptation set comprises a representation corresponding to the input characteristics, and
wherein the second adaptation set comprises a plurality of representations corresponding to the set of Output CMAF tracks.

11. The device of claim 8, wherein the CPT the DASH MPD comprises a first DASH MPD corresponding to the input characteristics and a second DASH MPD corresponding to the output characteristics and the plurality of encoding parameters.

12. The device of claim 11, wherein the second DASH MPD comprises an adaptation set including a plurality of representations corresponding to the set of Output CMAF tracks, and at least one additional descriptor corresponding to the plurality of encoding parameters.

13. The device of claim 11, wherein the second DASH MPD comprises an adaptation set including a plurality of representations corresponding to the set of Output CMAF tracks, and a JavaScript Object Notation (JSON) object specifying a representation identifier which identifies a representation in the first MPD, wherein the representation corresponds to the plurality of encoding parameters.

14. The device of claim 8, wherein the CPT comprises a JavaScript Object Notation (JSON) document including a first JSON object corresponding to the input characteristics, and an array of JSON objects corresponding to the output characteristics and the plurality of encoding parameters.

15. A non-transitory computer-readable medium storing instructions, the instructions comprising: one or more instructions that, when executed by one or more processors of a device for content preparation for a 5G media streaming (5GMS) network, cause the one or more processors to:
receive content to be prepared for the 5GMS network;
receive a content preparation template (CPT), wherein the CPT includes a Dynamic Adaptive Streaming over Hypertext Transfer Protocol (DASH) Media Presentation Description (MPD) that specifies input characteristics of an input Common Media Application Format (CMAF) track corresponding to the content, output characteristics of a set of output CMAF tracks corresponding to the content, and the plurality of encoding parameters corresponding to the set of output CMAF tracks, wherein the MPD includes at least one additional descriptor that includes a uniform resource identifier (URI) corresponding to at least one encoding parameter from the plurality of encoding parameters;
prepare the content according to the CPT; and
stream the prepared content over the 5GMS network to a media streaming client.

16. The non-transitory computer-readable medium of claim 15, wherein the DASH MPD includes a first adaptation set and a second adaptation set,
wherein the first adaptation set corresponds to the input characteristics, and
wherein the second adaptation set corresponds to the output characteristics and the plurality of encoding parameters.

17. The non-transitory computer-readable medium of claim 16, wherein the first adaptation set comprises a representation corresponding to the input characteristics, and
wherein the second adaptation set comprises a plurality of representations corresponding to the set of Output CMAF tracks.

18. The non-transitory computer-readable medium of claim 15, wherein the DASH MPD includes a first DASH MPD corresponding to the input characteristics and a second DASH MPD corresponding to the output characteristics and the plurality of encoding parameters.

19. The non-transitory computer-readable medium of claim 18, wherein the second DASH MPD comprises an adaptation set including a plurality of representations corresponding to the set of Output CMAF tracks, and
at least one from among:
the at least one additional descriptor corresponding to the at least one encoding parameter from the plurality of encoding parameters, and
a JavaScript Object Notation (JSON) object specifying a representation identifier which identifies a representation in the first MPD, wherein the representation corresponds to the plurality encoding parameters.

20. The non-transitory computer-readable medium of claim 15, wherein the CPT comprises a JavaScript Object Notation (JSON) document including a first JSON object corresponding to the input characteristics, and an array of JSON objects corresponding to the output characteristics and the plurality of encoding parameters.

* * * * *